(12) United States Patent
Tang et al.

(10) Patent No.: US 11,665,520 B2
(45) Date of Patent: May 30, 2023

(54) RESOURCE CONFIGURATION METHOD IN D2D COMMUNICATION AND TERMINAL DEVICE

(71) Applicant: Guangdong OPPO Mobile Telecommunications Corp., Ltd., Guangdong (CN)

(72) Inventors: Hai Tang, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/863,707

(22) Filed: Apr. 30, 2020

(65) Prior Publication Data
US 2020/0267523 A1    Aug. 20, 2020

Related U.S. Application Data

(63) Continuation of application No. PCT/CN2018/097616, filed on Jul. 27, 2018.

(30) Foreign Application Priority Data

Nov. 8, 2017    (WO) ................ PCT/CN2017/109970
May 31, 2018    (WO) ................ PCT/CN2018/089285

(51) Int. Cl.
*H04W 4/70*      (2018.01)
*H04W 76/27*     (2018.01)
(Continued)

(52) U.S. Cl.
CPC ......... *H04W 4/70* (2018.02); *H04W 28/0278* (2013.01); *H04W 72/0446* (2013.01);
(Continued)

(58) Field of Classification Search
CPC ... H04W 4/70; H04W 76/27; H04W 28/0278; H04W 72/0413; H04W 72/0446;
(Continued)

(56) References Cited

U.S. PATENT DOCUMENTS

2017/0280469 A1     9/2017  Park et al.
2019/0394786 A1*   12/2019  Parron ................ H04L 27/0006
(Continued)

FOREIGN PATENT DOCUMENTS

CN          102792745 A     11/2012
CN          103188742 A      7/2013
(Continued)

OTHER PUBLICATIONS

3GPP TSG RAN WG1 #90bis; R1-1717553; Source: Samsung; Title: Mode-4 support in V2X CA, Prague, Czech Republic, Oct. 9-13, 2017; (Year: 2017).*
(Continued)

*Primary Examiner* — Mohammed S Chowdhury
(74) *Attorney, Agent, or Firm* — Bayes PLLC

(57) ABSTRACT

A method and a terminal device for resource configuration in D2D communications includes performing, by a terminal device, resource sensing on at least one carrier based on a first parameter set to obtain an available resource set on the at least one carrier. A resource in an available resource set on each carrier can be used to transmit a target service. The method also includes reporting, by the terminal device, information about the available resource set on the at least one carrier to a network device. The information about the available resource set is used for the network device to determine a target resource for transmitting the target service. Therefore, the terminal device performs resource sensing and reports the obtained available resource set, so that the network device can allocate an appropriate transmission (Continued)

resource to the terminal device based on the information about the available resource set, thereby reducing interference.

14 Claims, 9 Drawing Sheets

(51) Int. Cl.
| | |
|---|---|
| H04W 28/02 | (2009.01) |
| H04W 72/0446 | (2023.01) |
| H04W 72/0453 | (2023.01) |
| H04W 80/02 | (2009.01) |
| H04W 72/21 | (2023.01) |
| H04W 72/53 | (2023.01) |
| H04W 92/18 | (2009.01) |

(52) U.S. Cl.
CPC ....... *H04W 72/0453* (2013.01); *H04W 72/21* (2023.01); *H04W 72/53* (2023.01); *H04W 76/27* (2018.02); *H04W 80/02* (2013.01); *H04W 92/18* (2013.01)

(58) Field of Classification Search
CPC ......... H04W 72/0453; H04W 72/0493; H04W 80/02; H04W 92/18; H04W 4/46; H04W 74/0808; H04W 72/082; H04W 72/042; H04W 76/14; H04W 72/0406; H04W 72/04; H04W 72/02; H04W 24/02; H04W 72/1278; H04W 4/40; H04W 72/21; H04W 72/53; H04W 72/20; H04W 72/23; H04W 72/541; H04L 5/0033; H04L 5/0044; H04L 5/001; H04L 5/0091; H04L 5/0064

See application file for complete search history.

(56) References Cited

U.S. PATENT DOCUMENTS

| | | | | |
|---|---|---|---|---|
| 2020/0068534 | A1* | 2/2020 | Li | H04L 5/0044 |
| 2020/0107297 | A1* | 4/2020 | Wang | H04W 72/0446 |
| 2020/0128562 | A1* | 4/2020 | Hou | H04L 5/0092 |
| 2020/0213998 | A1* | 7/2020 | Sun | H04L 5/0051 |
| 2020/0383088 | A1* | 12/2020 | Min | H04W 72/02 |

FOREIGN PATENT DOCUMENTS

| | | |
|---|---|---|
| CN | 103428712 A | 12/2013 |
| CN | 104125610 A | 10/2014 |
| CN | 104540236 A | 4/2015 |
| CN | 106470483 A | 3/2017 |
| CN | 106900005 A | 6/2017 |
| CN | 106937380 A | 7/2017 |
| CN | 107027105 A | 8/2017 |
| EP | 3125643 A1 | 2/2017 |
| GN | 107113293 A | 8/2017 |
| GN | 107295562 A | 10/2017 |
| JP | 2020519054 A | 6/2020 |
| RU | 2630410 C2 | 9/2017 |
| WO | 2016187807 A1 | 12/2016 |
| WO | 2016192043 A1 | 12/2016 |
| WO | 2017/116108 A1 | 7/2017 |
| WO | 2017176095 A1 | 10/2017 |
| WO | 2017195538 A1 | 11/2017 |
| WO | 2018201390 A1 | 11/2018 |

OTHER PUBLICATIONS

3GPP TSG RAN WG1 Meeting 90bis; R1-1717415; Source: ASTRI, TCL Communication Ltd.; Title: Resource selection for V2X systems supporting CA, Prague, CZ, Oct. 9-13, 2017 (Year: 2017).*
3GPP TSG RAN WG1 Meeting #90bis; R1-1718036; Source: OPPO (same assignee); Title: Mode 4 support in eV2X carrier aggregation, Prague, CZ, Oct. 9-13, 2017. (Year: 2017).*
Intel Corporation, "Corporation Resource Selection Latency Reduction for LTE V2V Slidelink Communication", 3GPP TSG RAN WG1 Meeting #90, R1-1712490, Prague, CZ, Aug. 21-25, 2017.
Intel Corporation, "Slidelink measurements for V2V sensing and resource re-selection procedures", 3GPP TSG RAN WG1 Meeting #86, R1-166511, Gothennburg, Sweden, Aug. 22-26, 2016.
European Patent Application No. 18876195.1, Extended European search report, dated Oct. 19, 2020.
ITRI, "Discussion on Sharing Resource Pool for eNB-Controlled and UE-Autonomous in V2V Communication", 3GPP TSG RAN WG1 Meeting 90bis, R1-1718083, Prague, CZ, Oct. 9-13, 2017.
Catt, "Discussion on resource pool sharing between mode 3 and mode 4", 3GPP TSG RAN WG1 Meetting #90bis, R1-1717794, Prague, CZ, Oct. 9-13, 2017.
International Application No. PCT/CN2018/097616, International search report, dated Nov. 1, 2018, 2 pages.
International Application No. PCT/CN2018/089285, International search report, dated Aug. 24, 2018, 2 pages.
International Application No. PCT/CN2017/109970, International search report, dated Jul. 27, 2018, 3 pages.
First Office Action issued in corresponding Chinese Application No. 202010313771.1, dated May 26, 2021, 15 pages.
First Office Action issued in corresponding Canadian Application No. 3,082,263, dated Jun. 4, 2021, 4 pages.
The Second Office Action issued in corresponding Chinese Application No. 202010313771.1, dated Jul. 30, 2021, 13 pages.
Communication pursuant to Article 94(3) EPC issued in corresponding European Application No. 18876195.1, dated Jul. 12, 2021, 7 pages.
Third Office Action issued in corresponding Chinese Application No. 202010313771.1, dated Nov. 2, 2021, 14 pages.
Official Action issued in corresponding Russian Application No. 2020118874, dated Nov. 15, 2021, 10 pages.
The First Office Action issued in corresponding Taiwanese Application No. 107139639, dated Nov. 19, 2021, 15 pages.
Communication pursuant to Article 94(3) EPC issued in European Application No. 18876195.1, dated Jan. 19, 2022, 9 pages.
"Sharing Resource Pool for eNB-controlled and LIE-autonomous V2V Transmissions Modes", Agenda item: 7.2.3.1.2, Source: Intel Corporation, 3GPP TSG RAN1 WG Meeting #88bis, R1-1704686, Spokane, USA, Apr. 3-7, 2017, 5 pages.
"Discussion on resource pool sharing between mode 3 and mode 4", Agenda Item: 6.2.3.1.3, Source: CATT, 3GPP TSG RAN WG1 Meeting #89, R1-1707450, Hangzhou, China May 15-19, 2017, 3 pages.
"Discussion on resource pool sharing between mode 3 and mode 4", Agenda Item: 6.2.3.1.3, Source: Xinwei, 3GPP TSG RAN WG1 Meeting #89, R1-1707106, Hangzhou, China May 15-19, 2017, 3 pages.
"Resource pool sharing between UEs using mode 3 and UEs using mode 4", Agenda Item: 6.2.3.1.3, Source: NTT Docomo, Inc., 3GPP TSG RAN WG1 Meeting #89 R1-1708427, Hangzhou, China, May 15-19, 2017, 3 pages.
"Discussion on resource pool sharing between UEs using mode 3 and 4", Agenda item: 6.2.3.1.3, Source: LG Electronics, 3GPP TSG RAN WG1 Meeting #89 R1-1707561, Hangzhou, China May 15-19, 2017, 2 pages.
"Radio resource pool sharing between UEs using mode 3 and UEs using mode 4", Agenda item: 9.10.3, Source: LG Electronics Inc., 3GPP TSG-RAN2#99 R2-1709133, Berlin, Germany, Aug. 21-25, 2017, 2 pages.
First Office Action issued in corresponding Japanese Application No. 2020-524399, dated Jun. 14, 2022, 10 pages.
Second Office Action issued in corresponding Canadian Application No. 3082263, dated May 9, 2022, 5 pages.
Communication pursuant to Article 94(3) EPC issued in corresponding European Application No. 18876195.1, dated Jul. 1, 2022, 7 pages.

(56) References Cited

OTHER PUBLICATIONS

"Discussion on resource pool sharing between UEs in mode 3 and UEs in mode 4", R1-1717774, Source: Panasonic, 3GPP TSG RAN WG1 Meeting #90bis, Prague, CZ, Oct. 9-13, 2017, 3 pages.
"Mode 3 UE behaviour for resource pool sharing", R2-1808673, Source: Samsung, 3GPP TSG-RAN WG2 Meeting #102, Busan, Korea, May 21-25, 2018, 3 pages.
First Office action issued in corresponding India Application No. 202017023912, dated Jan. 31, 2022, 5 pages.
Second Office Action issued in corresponding Taiwanese application No. 107139639, dated Aug. 18, 2022.
Second Office Action issued in corresponding Japanese application No. 2020-524399, dated Sep. 27, 2022.
Intel Corporation, "On Sidelink Resource Pool Sharing for eNB-Controlled and UE-Autonomous V2V Transmission Modes", R1-1806484, 3GPP TSG RAN WG1 Meeting #93 Busan, Korea, May 21-25, 2018.
Notice of Allowance issued in corresponding European application No. 18876195.1, dated Feb. 7, 2023.

\* cited by examiner

RESOURCE CONFIGURATION METHOD IN D2D COMMUNICATION AND TERMINAL DEVICE

CROSS-REFERENCES TO RELATED APPLICATIONS

This application is a continuation of and claims priority to International Patent Application PCT/CN2018/097616, filed Jul. 27, 2018, which claims priority to International Patent Applications PCT/CN2017/109970, filed Nov. 8, 2017, and PCT/CN2018/089285, filed May 31, 2018, the contents of which are hereby incorporated by reference in their entirety.

BACKGROUND OF THE INVENTION

Technical Field

Embodiments of this application relate to the field of radio communications, and in particular, to a method, a terminal device, and a network device for resource configuration in device to device (D2D) communications.

Related Art

An Internet of Vehicles (IoV) communications system, also known as a Vehicle to Everything (V2X) communications system, is a sidelink (SL) transmission technology based on D2D communications. Different from a conventional Long Term Evolution (LTE) system in which data is received or transmitted through a base station, an Internet of Vehicles system performs direct device-to-device communication, and therefore, has higher spectrum efficiency and lower transmission latency.

Two transmission modes are defined in the Internet of Vehicles system: a transmission mode 3 (mode 3) and a transmission mode 4 (mode 4). Transmission resources used by a terminal device that uses the transmission mode 3 are allocated by a network device, but a terminal device that uses the transmission mode 4 can independently select transmission resources. When a resource pool is shared by the terminal device that uses the transmission mode 3 and the terminal device that uses the transmission mode 4, a conflict may occur between a resource allocated by the network device to the terminal device that uses the transmission mode 3 and a resource selected by the terminal device that uses the transmission mode 4. Therefore, an urgent problem to be resolved is how the network device efficiently allocates resources to the terminal device while reducing interference.

SUMMARY OF THE INVENTION

Embodiments of this application provide a method, a terminal device, and a network device for resource configuration in D2D communications, so that the network device can efficiently allocate resources to the terminal device while reducing interference.

According to a first aspect, a method for resource configuration in D2D communications is provided, including: performing, by a terminal device, resource sensing on at least one carrier based on a first parameter set to obtain an available resource set on the at least one carrier, where a resource in an available resource set on each carrier can be used to transmit a target service, and the first parameter set includes at least one of: information about a resource for performing the resource sensing, a condition parameter for determining the available resource set, or a transmission parameter of the target service; and reporting, by the terminal device, information about the available resource set on the at least one carrier to a network device.

Optionally, the target resource is a resource in the available resource set that is reported by the terminal device and that is on the at least one carrier, and the target resource may include one or more resources.

Therefore, in the embodiment of this application, the terminal device performs resource sensing based on a specific transmission parameter, and determines the available resource set based on a sensing result. By reporting the available resource set to the network device, the terminal device assists the network device in allocating a transmission resource to the terminal device, thereby reducing interference.

According to a second aspect, a method for resource configuration in D2D communications is provided, including: receiving, by a network device, information reported by a terminal device about an available resource set on at least one carrier, where a resource in an available resource set on each carrier may be used to transmit a target service; and determining, by the network device, in the available resource set on the at least one carrier, a target resource for transmitting the target service.

Optionally, the target resource is a resource in the available resource set that is reported by the terminal device and that is on the at least one carrier, and the target resource may include one or more resources.

Therefore, in the embodiment of this application, the network device can allocate the transmission resource to the terminal device in the available resource set based on the available resource set reported by the terminal device. The resource in the available resource set is obtained by the terminal device based on the sensing result, and therefore, the selecting, by the network device, the resource for the terminal device in the available resource set can significantly reduce interference caused by and to other terminal devices.

According to a third aspect, a terminal device is provided. The terminal device can perform operations of the terminal device in the first aspect or in any optional implementation of the first aspect. Specifically, the terminal device may include a module or unit that is configured to perform the operations of the terminal device in the first aspect or in any possible implementation of the first aspect.

According to a fourth aspect, a network device is provided. The network device can perform operations of the network device in the second aspect or in any optional implementation of the second aspect. Specifically, the network device may include a module or unit that is configured to perform the operations of the network device in the second aspect or in any possible implementation of the second aspect.

According to a fifth aspect, a terminal device is provided. The terminal device includes: a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the terminal device is enabled to perform the method in the first aspect or in any possible implementation of the first aspect, or the terminal device is enabled to implement the terminal device according to the third aspect.

According to a sixth aspect, a network device is provided. The network device includes: a processor, a transceiver, and a memory the processor, the transceiver, and the memory communicate with each other through an internal connection path. The memory is configured to store an instruction, and the processor is configured to execute the instruction stored in the memory. When the processor executes the instruction stored in the memory, the network device is enabled to perform the method in the second aspect or in any possible implementation of the second aspect, or the network device is enabled to implement the network device according to the fourth aspect.

According to a seventh aspect, a computer-readable storage medium is provided. The computer-readable storage medium stores a program. The program enables a terminal device to perform the method for resource configuration in D2D communications according to the first aspect and any of various implementations of the first aspect.

According to an eighth aspect, a computer-readable storage medium is provided. The computer-readable storage medium stores a program. The program enables a network device to perform the method for resource configuration in D2D communications according to the second aspect and any of various implementations of the second aspect.

According to a ninth aspect, a chip is provided. The chip includes an input interface, an output interface, a processor, and a memory. The processor is configured to execute an instruction stored in the memory. When the instruction is executed, the processor is enabled to implement the method according to the first aspect or any possible implementation of the first aspect.

According to a tenth aspect, a chip is provided. The chip includes an input interface, an output interface, a processor, and a memory. The processor is configured to execute an instruction stored in the memory. When the instruction is executed, the processor is enabled to implement the method according to the second aspect or any possible implementation of the second aspect.

According to an eleventh aspect, a computer program product including an instruction is provided. When the computer program product is run on a computer, the computer is enabled to execute the method according to the first aspect or any possible implementation of the first aspect.

According to a twelfth aspect, a computer program product including an instruction is provided. When the computer program product is run on a computer, the computer is enabled to execute the method according to the second aspect or any possible implementation of the second aspect.

According to a thirteenth aspect, a communications system is provided. The communications system includes a terminal device and a network device.

The terminal device is configured to: perform resource sensing on at least one carrier based on a first parameter set to obtain an available resource set on the at least one carrier, where a resource in an available resource set on each carrier can be used to transmit a target service, and the first parameter set includes at least one of: information about a resource for performing the resource sensing, a condition parameter for determining the available resource set, or a transmission parameter of the target service.

The network device is configured to: receive information reported by a terminal device about an available resource set on at least one carrier, where a resource in an available resource set on each carrier may be used to transmit a target service; and determine, in the available resource set on the at least one carrier, a target resource for transmitting the target service.

Further, the terminal device is configured to perform the method according to the first aspect or any possible implementation of the first aspect, and the network device is configured to perform the method according to the second aspect or any possible implementation of the second aspect.

DETAILED DESCRIPTION OF THE INVENTION

The technical solutions in the embodiments of this application are described below with reference to the accompanying drawings.

It should be understood that, the technical solutions of the embodiments of this application can be applied to various communications systems, for example, a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE Time Division Duplex (TDD) system, a Universal Mobile Telecommunication System (UMTS), and a further 5G communications system.

This application describes the embodiments with reference to a terminal device. The terminal device may alternatively be user equipment (UE), an access terminal, a user unit, a user station, a mobile site, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a Wireless Local Loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

This application describes the embodiments with reference to a network device. The network device may be a device communicating with the terminal device. For example, the network device may be a base transceiver station (BTS) in a GSM system or a CDMA system, or may be a NodeB (NB) in a WCDMA system, or may be an evolved NodeB (eNB or eNodeB) in an LTE system. Alternatively, the network device may be a relay node, an access point, an in-vehicle device, a wearable device, a network-side device in a future 5G network, a network-side device in a future evolved PLMN network, or the like.

Figure 1:
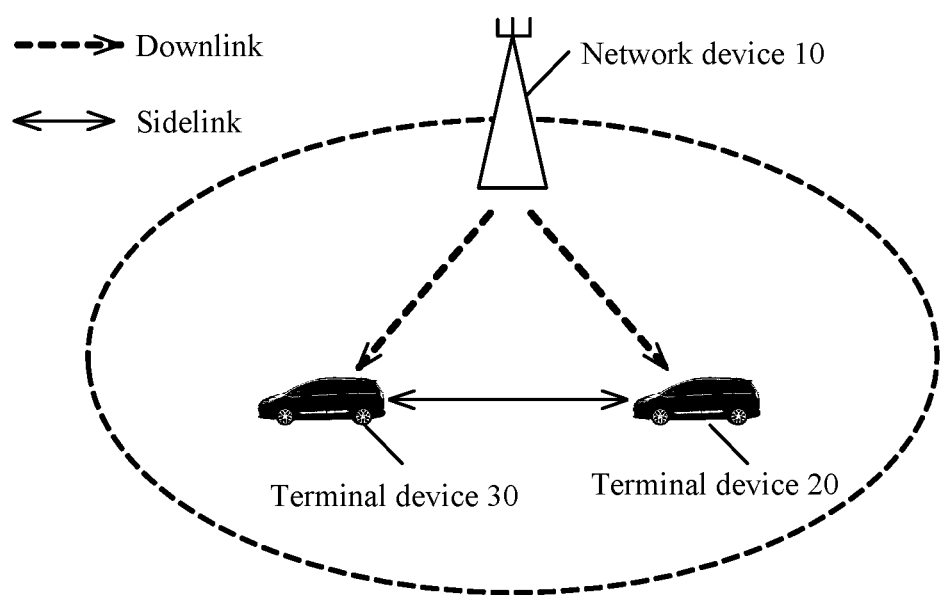
FIG. 1 is a schematic structural diagram of an application scenario according to an embodiment of this application.
Figure 2:
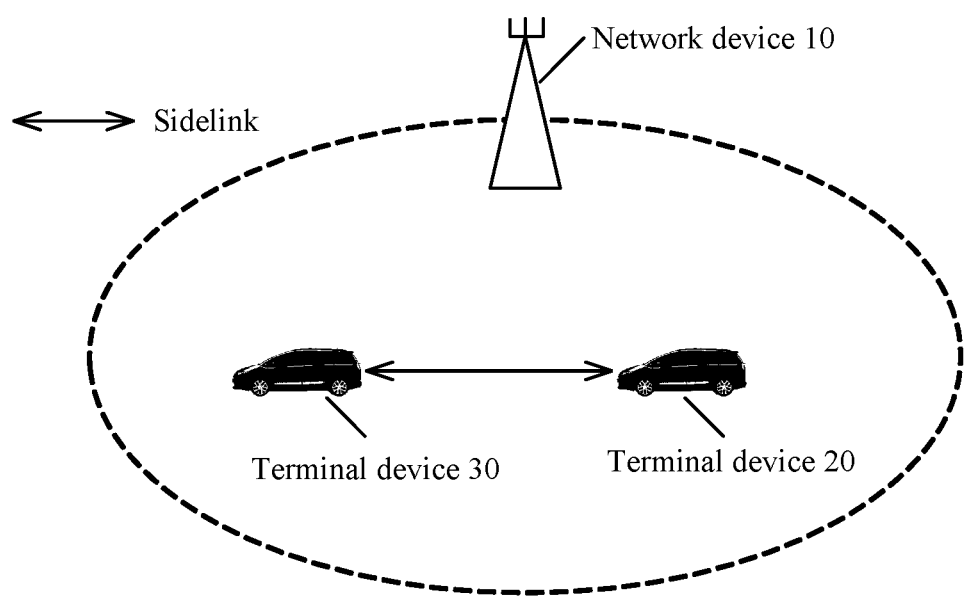
FIG. 2 is a schematic structural diagram of another application scenario according to an embodiment of this application.

FIG. 1 and FIG. 2 are schematic diagrams of a possible application scenario according to an embodiment of this application. FIG. 1 illustrates one network device and two terminal devices. Optionally, a radio communications system may include a plurality of network devices, and another number of terminal devices may be included in coverage of each network device. This is not limited in the embodiment of this application. In addition, the radio communications system may further include other network entities such as a mobility management entity (MME), a serving gateway (S-GW), and a packet data network gateway (P-GW). However, the embodiments of this application are not limited thereto.

Specifically, a terminal device 20 and a terminal device 30 may communicate in a D2D communications mode. During D2D communication, the terminal device 20 directly communicates with the terminal device 30 through a D2D link, that is, a sidelink (SL). For example, as shown in FIG. 1 or FIG. 2, the terminal device 20 directly communicates with the terminal device 30 through a sidelink. In FIG. 1, a transmission resource for the communication performed between the terminal device 20 and the terminal device 30 through the sidelink is allocated by the network device. In FIG. 2, a transmission resource for the communication performed between the terminal device 20 and the terminal device 30 through the sidelink is independently selected by the terminal device, and does not need to be allocated by the network device.

The D2D communication may mean Vehicle to Vehicle (V2V) communication or Vehicle to Everything (V2X) communication. In the V2X communication, X may be any device capable of radio reception and transmission, such as but not limited to a slowly moving wireless apparatus, a fast moving in-vehicle device, or a network control node capable of radio transmission and reception. Understandably, the embodiments of this application are mainly applied to a V2X communication scenario, but are also applicable to any other D2D communication scenarios. This is not limited in the embodiments of this application.

In Release-14 of the 3GPP protocol, two transmission modes are defined: a transmission mode 3 (mode 3) and a transmission mode 4 (mode 4). The transmission resource of the terminal device that uses the transmission mode 3 is allocated by a base station. The terminal device performs data transmission on the sidelink by using the resource allocated by the base station. The base station may allocate the resource for a single transmission to the terminal device, or may allocate a semi-static transmission resource to the terminal device. If the terminal device that uses the transmission mode 4 is capable of sensing, data is transmitted by means of sensing and reservation. If the terminal device is not capable of sensing, the terminal device randomly selects a transmission resource in a resource pool. The terminal device capable of sensing obtains an available resource set in the resource pool by means of sensing, and the terminal device randomly selects a resource in the set to perform data transmission. Because a service in the Internet of Vehicles system is periodic, the terminal device generally uses a semi-static transmission mode. To be specific, after selecting a transmission resource, the terminal device continuously uses the resource in a plurality of transmission periods, thereby reducing resource reselection and a probability of resource conflicts. Control information for a current transmission carries information about a resource reserved by the terminal device for a next transmission. Therefore, by detecting the control information of the terminal device, other terminal devices can determine whether the resource has been reserved and used by the terminal device, thereby fulfilling the purpose of reducing resource conflicts.

In Release-14 of the 3GPP protocol, the resource pool corresponding to the transmission mode 3 is orthogonal to the resource pool corresponding to the transmission mode 4. The terminal device that uses the mode 3 performs data transmission on a time-frequency resource in the resource pool that supports the mode 3, and the terminal device that uses the mode 4 performs data transmission on a time-frequency resource in the resource pool that supports the mode 4.

In the new Release-15 of the 3GPP protocol, to improve a utilization ratio of resources, the terminal device that uses the transmission mode 3 and the terminal device that uses the transmission mode 4 can share a resource pool. The terminal device that uses the transmission mode 3 is connected to the base station, and its transmission resource is allocated by the base station. However, when allocating a resource for the terminal device that uses the transmission mode 3, the base station is not aware of resource occupation status in the resource pool. If the resource allocated by the base station to the terminal device that uses the transmission mode 3 has been occupied by the terminal device that uses the transmission mode 4, interference may occur.

Therefore, in the embodiment of this application, the terminal device performs resource sensing based on a specific transmission parameter, and determines the available resource set based on a sensing result. By reporting the available resource set to the network device, the terminal device assists the network device in allocating a transmission resource to the terminal device, thereby reducing interference.

Understandably, in the embodiment of this application, the terminal device that supports Release-15 may include a terminal device that supports Release-15, or a terminal device that supports another release in addition to Release-15, for example, a terminal device that supports Release-16 in addition to Release-15.

Figure 3:
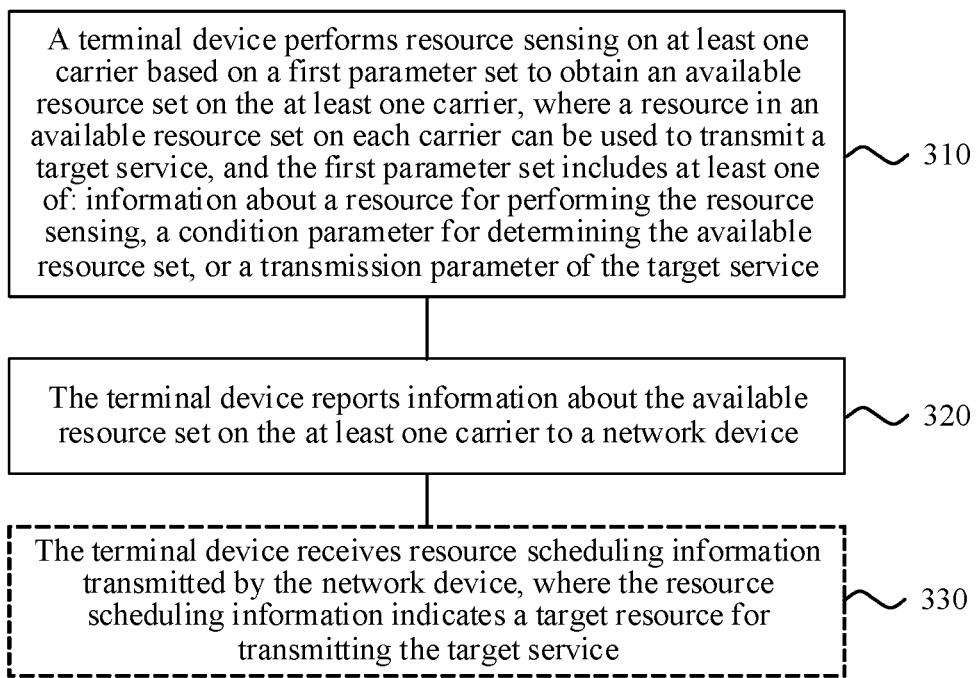
FIG. 3 is a schematic flowchart of a method for resource configuration in D2D communications according to an embodiment of this application.

FIG. 3 is a schematic flowchart of a method for resource configuration in D2D communications according to an embodiment of this application. The method may be performed by a terminal device. The terminal device may be, for example, the terminal device 20 or the terminal device 30 shown in FIG. 1. The method for resource configuration includes at least a part of the following content.

In step 310, the terminal device performs resource sensing on at least one carrier based on a first parameter set to obtain an available resource set on the at least one carrier.

Resources in an available resource set on each carrier may be used to transmit a target service. The first parameter set includes at least one of: information about a resource for performing the resource sensing, a condition parameter for determining the available resource set, or a transmission parameter of the target service.

In step 320, the terminal device reports information about the available resource set on the at least one carrier to a network device.

The information about the available resource set is used for the network device to determine a target resource for transmitting the target service.

Optionally, the method further includes step 330.

In step 330, the terminal device receives resource scheduling information transmitted by the network device, where the resource scheduling information indicates the target resource for transmitting the target service.

Optionally, the target resource is a resource in the available resource set that is reported by the terminal device and that is on the at least one carrier, and the target resource may include one or more resources. All resources in the available resource set are available transmission resources, briefly referred to as available resources. For example, the available resources are resources that are obtained by the terminal device after resource sensing, that meet requirements and that can be used to transmit the target service.

Specifically, before transmitting the target service, the terminal device may perform resource sensing on one or more carriers based on parameters in the first parameter set, and determine an available resource set on the one or more carriers based on a sensing result. The resources in the available resource set can be used for the terminal device to transmit the target service. After determining the available resource set on the at least one carrier, the terminal device reports the information about the available resource set on the at least one carrier to the network device, so that the network device is assisted in allocating a transmission resource for the target service. After receiving the available resource set that is reported by the terminal device and that is on the at least one carrier, the network device may select, in the available resource set, an appropriate transmission resource for the target service, and use resource scheduling information to indicate to the terminal device the target resource for transmitting the target service.

Specifically, the terminal device may be, for example, a terminal device that uses a first transmission mode in Release-15. The first transmission mode may be, for example, equivalent to the transmission mode 3 in Release-14 of the 3GPP protocol. When the terminal device uses the first transmission mode, a time-frequency resource used by the terminal device to perform the data transmission is a resource scheduled by the network device.

Therefore, the terminal device performs resource sensing based on a specific transmission parameter, and determines the available resource set based on a sensing result. By reporting the available resource set to the network device, the terminal device assists the network device in allocating a transmission resource to the terminal device, thereby reducing interference.

Optionally, the information about the resource for performing the resource sensing includes at least one of: information about a resource pool for performing the resource sensing, information about a carrier for performing the resource sensing, information about a subband for performing the resource sensing, information about a number of PRBs for performing the resource sensing, information about a sensing window for performing the resource sensing, or information about a resource selection window for performing the resource sensing. The information about the resource selection window may include, for example, a value of T1, a value of T2, information about the length of the selection window, and the like.

Optionally, the condition parameter for determining the available resource set includes at least one of: a physical sidelink shared channel-reference signal received power (PSSCH-RSRP) threshold, the number of resources in the available resource set, or a percentage of available resources.

The percentage of available resources is a ratio of the number of resources in the available resource set to the total number of resources in the sensing window for performing the resource sensing.

Optionally, the transmission parameter of the target service includes at least one of the following parameters: information about a priority of the target service, information about a traffic volume of the target service, a transmission period of the target service, latency of the target service, a number of times of retransmission of the target service, a data packet size of the target service, or a modulation and coding scheme of the target service.

For example, based on an index of a carrier in the first parameter set, information about a resource pool on the carrier, a size of a sub-band that needs resource sensing, a number of PRBs that need resource sensing, the information about the sensing window, and the like, the terminal device may perform resource sensing in the sensing window based on the size of the subband or the number of the PRBs. The terminal device may perform resource exclusion based on the PSSCH-RSRP threshold and the quantity (such as B) of resources required in an available resource set on each carrier to exclude resources that have a measured PSSCH-RSRP value higher than the PSSCH-RSRP threshold and that are occupied and/or reserved by other terminal devices. In addition, the terminal device may select B resources with a smallest received signal strength indicator (RSSI) value in the remaining resources, and use them as the available resource set that can be used to transmit the target service.

In another example, based on the transmission parameter of the target service in the first parameter set, such as a data packet size of the target service, or a modulation and coding scheme of the target service, or the like, the terminal device may determine the size of the subband that needs resource sensing and/or the number of PRBs that need resource sensing or the like. In this way, resource sensing is performed in the sensing window of the corresponding carrier based on the size of the subband or the number of PRBs, and an available transmission resource is selected in the resource selection window based on a sensing result.

In another example, based on the data packet size of the target service, information about a period of the target service, or information about a priority of the target service or the like, the terminal device may determine the size of the subband that needs resource sensing and/or the number of PRBs that need resource sensing or the like. In this way, resource sensing is performed in the sensing window of the corresponding carrier based on the size of the subband or the number of PRBs, and an available transmission resource is selected in the resource selection window based on a sensing result.

In another example, the terminal device may determine a PSSCH-RSRP threshold based on the information about the priority of the target service, perform resource sensing based on the PSSCH-RSRP threshold, and select an available transmission resource in the resource selection window based on a sensing result.

In another example, the terminal device may determine a size of the resource selection window based on information about latency of the target service, and then select an available transmission resource in the resource selection window based on a result of the resource sensing.

In another example, the terminal device determines a size of the resource selection window based on the information about the resource selection window, and determines an available resource in the resource selection window based on a sensing result. The information about the resource selection window may include, for example, at least one of: a start point of the resource selection window, an end point of the resource selection window, or a window length.

Optionally, before step 310, that is, before the terminal device performs resource sensing on the at least one carrier based on the first parameter set, the method further includes: receiving, by a physical layer of the terminal device, the first parameter set transmitted by a higher layer of the terminal device; or receiving, by the terminal device, the first parameter set transmitted by the network device.

Optionally, before the receiving, by the physical layer of the terminal device, the first parameter set transmitted by the network device, the method further includes: reporting, by the terminal device, a second parameter set to the network device.

The second parameter set includes at least one of: a channel busy ratio (CBR) of each of at least one carrier, a buffer status report (BSR), a transmission period of the target service, a priority of the target service, or a latency requirement of the target service.

Specifically, if the terminal device obtains the first parameter set by using the network device, before receiving the first parameter set transmitted by the network device, the terminal device may transmit a second parameter set to the network device, so that the network device determines the first parameter set based on the second parameter set, and transmits the first parameter set to the terminal device for selecting the available resource set. The second parameter set may be, for example, the CBR, the BSR, the transmission period of the target service, the latency of the target service, or the information about the priority of the target service, or the like.

In this embodiment, the terminal device transmits the second parameter set to the network device, so that the network device determines the first parameter set for performing resource sensing and resource selection. In this way, the terminal device obtains the available resource set based on the first parameter set and reports the available resource set, and the network device can allocate a transmission resource to the terminal device based on the available resource set, thereby reducing interference.

Optionally, in step 320, the reporting, by the terminal device, the information about the available resource set on the at least one carrier to the network device includes: reporting, by the terminal device, the information about the available resource set on the at least one carrier to the network device by using uplink control information (UCI), a Media Access Control (MAC) control element (CE), or Radio Resource Control (RRC) signaling.

Optionally, in step 320, the reporting, by the terminal device, the information about the available resource set on the at least one carrier to the network device includes: reporting, by the terminal device, assistance information (UEAssistanceInformation) of the terminal device while reporting the information about the available resource set on the at least one carrier to the network device.

In other words, while reporting the information about the available resource set, the terminal device reports the assistance information concurrently. The assistance information may include, for example, information about a traffic volume of the target service, the priority of the target service, or a period of the target service. For details of the assistance information of the terminal device, refer to description on UEAssistanceInformation in existing protocols.

Optionally, the reporting, by the terminal device, the information about the available resource set on the at least one carrier to the network device includes: reporting, by the terminal device, a resource bitmap of the at least one carrier to the network device, where the resource bitmap of each carrier includes a plurality of bits, the plurality of bits are in one-to-one correspondence with a plurality of resources in the sensing window in which the terminal device performs the resource sensing on each carrier, or the plurality of bits are in one-to-one correspondence with a plurality of resources in a part of the sensing window in which the terminal device performs the resource sensing on each carrier, or the plurality of bits are in one-to-one correspondence with a plurality of resources in a resource selection window of the terminal device on each carrier, and a value of each of the plurality of bits indicates whether a resource corresponding to the each bit belongs to an available resource set on each carrier.

The resource selection window may mean all resources in a time range [n+T1, n+T2], where T1≥0, T2≥T1, and n is a time point of performing resource sensing.

A possible implementation is that all sensed resources on a carrier are represented by a resource bitmap. The resource bitmap includes a plurality of bits, and each bit corresponds to a resource. The plurality of bits are in one-to-one correspondence with the plurality of resources that are sensed on the carrier. The value of each bit is used to indicate whether the resource corresponding to the bit is available, that is, whether the resource belongs to the available resource set on the carrier. For example, in the process of resource sensing performed by the terminal device, if the resource is available, the value of the bit corresponding to the resource is set to 1; or, if the resource is not available, the value of the bit corresponding to the resource is set to 0. The number of all available resources finally obtained is equal to the number of resources in the available resource set, where the number of resources is set in the first parameter. The terminal device finally reports the resource bitmap corresponding to the carrier to the network device. In this way, the network device is aware of the resources on the carrier that are available for transmitting the target service, and selects the target resource in the available resources to transmit the target service.

Optionally, resources in a part of the sensing window on a carrier are represented by a resource bitmap. For example, the sensing window is [n−1000, n−1], where n is a time point of performing resource sensing. However, the resource bitmap is in one-to-one correspondence with the resources in the part of the sensing window, where the part of sensing window is [n−100, n−1]. For the rest, refer to the relevant description in the foregoing embodiment, and details are not described herein again.

Optionally, resources in a selection window on a carrier are represented by a resource bitmap. For example, the terminal device performs sensing in the sensing window [n−1000, n−1], and determines the resources available in the selection window [n, n+100]. An available resource is represented by 1, and an unavailable resource is represented by 0. The resource bitmap is in one-to-one correspondence with a plurality of resources in the selection window. The terminal device finally reports the resource bitmap corresponding to the carrier to the network device. In this way, the network device is aware of the resources on the carrier that are available for transmitting the target service, and selects the target resource in the available resources to transmit the target service.

In another possible implementation, the resource bitmap includes a first resource bitmap, the first resource bitmap includes a plurality of bits, the plurality of bits are in one-to-one correspondence with a plurality of time units in a first time range, and a value of each of the plurality of bits indicates whether an available resource exists in a time unit corresponding to the each bit. The time unit may include, for example, a subframe, or a slot.

The first time range may be, for example, a sensing window for the terminal device to perform the resource sensing, or a resource selection window for performing resource selection.

Further, optionally, the resource bitmap includes a second resource bitmap, the second resource bitmap includes a plurality of bits, the plurality of bits are in one-to-one correspondence with a plurality of frequency-domain units in a first frequency-domain range, and a value of each of the plurality of bits indicates whether an available resource exists in a frequency-domain unit corresponding to the each bit. The frequency-domain units may include, for example, an RBG, a subband, and an RB.

The first frequency-domain range may be, for example, a frequency-domain range of a system bandwidth for the terminal device to perform the resource sensing, or a frequency-domain range of a resource pool for performing the resource sensing.

For example, the resource bitmap includes a first resource bitmap and a second resource bitmap. A plurality of bits in the first resource bitmap are in one-to-one correspondence with a plurality of subframes. A plurality of bits in the second resource bitmap are in one-to-one correspondence with a plurality of subbands. If a resource on a time unit indicated by a bit in the first resource bitmap is an available resource, and a resource on a frequency-domain unit indicated by a bit in the second resource bitmap is an available resource, then a resource formed from the time unit and the frequency-domain unit belongs to the available resource set.

In another possible implementation, the information about the available resource set further includes a time-domain index of at least one time unit in a second time range, an available resource exists on a time unit corresponding to each time-domain index, and the second time range may be a sensing window for the terminal device to perform the resource sensing, or a resource selection window for performing resource selection. The time unit may include, for example, a subframe, or a slot. In this case, optionally, the resource bitmap may include a second resource bitmap. A bit in the second resource bitmap may indicate a specific frequency-domain location of the available resource that exists on a time unit corresponding to a time-domain index carried in the information about the available resource set.

For example, if the second time range is a resource selection window [n, n+100] milliseconds and the available resource set includes an index k of a subframe in the resource selection window, then it indicates that an available resource exists on the subframe corresponding to the index k. Further, if the available resource set further includes a bitmap and each bit in the bitmap corresponds to a subband, then the available resource set indicates that, in the frequency-domain resources on the subframe k, a resource on the subband corresponding to a bit value 1 is an available resource.

In another possible implementation, the information about the available resource set further includes a frequency-domain index of at least one frequency-domain unit in a second frequency-domain range. An available resource exists on each frequency-domain unit, and the second frequency-domain range may be a frequency-domain range of a system bandwidth that is used for the terminal device to perform the source sensing, or a frequency-domain range of a resource pool for performing the resource sensing. The frequency-domain units may include, for example, an RBG, a subband, and an RB. In this case, optionally, the resource bitmap may include a first resource bitmap. A bit in the first resource bitmap may indicate a specific time-domain location of the available resource that exists on a frequency-domain unit corresponding to a frequency-domain index carried in the information about the available resource set.

Understandably, the terminal device may report the available resource set in the form of a resource bitmap; or the terminal device may directly report the time-domain location and/or the frequency-domain location of each available resource in the available resource set; or, the terminal device may also indicate the available resource set to the network device by other means. This is not limited in the embodiment of this application.

Optionally, the reporting, by the terminal device, the information about the available resource set on the at least one carrier to the network device includes: reporting, by the terminal device, an index of at least one candidate target resource in the available resource set on the at least one carrier to the network device.

An index of each candidate target resource in an available resource set on each carrier is used to indicate a location of each candidate target resource in the sensing window of each carrier, or indicate a location of each candidate target resource in the resource selection window of each carrier, or indicate a location of each candidate target resource in an available resource set on each carrier, or indicate a time-frequency resource location of each candidate target resource on each carrier.

In an implementation different from the foregoing implementation in which the resource bitmap is reported, the terminal device may not report all available resources in the available resource set to the network device, but select one or more resources in an available resource set on each carrier and use the resources as candidate target resources, and report only the candidate target resources to the network device, thereby reducing bit overheads. The number of the reported candidate target resources may be configured by the network device or specified in the protocol. In the candidate target resources, the network device may select one or more target resources for the terminal device to transmit the target service.

For example, the terminal device may, in an available resource set on each carrier, select several resources with the lowest value of sidelink received signal strength indicator S-RSSI or PSSCH-RSRP as candidate target resources, and report candidate target resource indexes to the network device. The number of the reported candidate target resource indexes is configured or pre-configured by the network device.

Each candidate target resource index on a carrier may be determined based on the resources in the sensing window of resource sensing on the carrier. For example, the index may indicate the location of each candidate target resource among all resources in the sensing window.

For example, assuming that the index is used to indicate the location of each candidate target resource in the sensing window and that the total number of resources in the sensing window in which the terminal device performs the resource sensing is 12, the indexes of the 12 resources are 1 to 12 successively based on the time-domain location thereof, and the number of candidate target resources is 4. If four resources that have the lowest value of S-RSSI or PSSCH-RSRP and that are selected by the terminal device after the sensing on the 12 resources are the resources indexed 1, 2, 4, and 7, the terminal device will report the indexes 1, 2 4, and 7 to the network device, so that the network device selects a target resource in the four resources and indicates the target resource to the terminal device.

Alternatively, each candidate target resource index on the carrier may be determined based on the resources in the resource selection window on the carrier. For example, the index may indicate the location of each candidate target resource among all resources in the resource selection window.

For example, assuming that the index is used to indicate the location of each candidate target resource in the resource selection window and that the total number of resources in the selection window in which the terminal device performs the resource selection is 12, the indexes of the 12 resources are 1 to 12 successively based on the time-domain location thereof, and the number of candidate target resources is 4. If, after the values of S-RSSI or PSSCH-RSRP on the 12 resources are sensed and forecast, four resources that have the lowest value of S-RSSI or PSSCH-RSRP and that are selected by the terminal device are the resources indexed 1, 2, 4, and 7, the terminal device will report the indexes 1, 2, 4, and 7 to the network device, so that the network device selects a target resource in the four resources and indicates the target resource to the terminal device.

Alternatively, each candidate target resource index on the carrier may be determined based on the resources in the available resource set obtained after the sensing is performed on the carrier. For example, the index may indicate the location of each candidate target resource among all resources in the available resource set.

Alternatively, each candidate target resource index on the carrier may be determined based on the location of each candidate target resource on the carrier, for example, determined based on a time-domain location and a frequency-domain location of the candidate target resource. In this case, the target resource index includes a time-domain location index and a frequency-domain location index of the candidate target resource on the carrier.

If the first parameter set is not transmitted by the network device to the terminal device, but is transmitted by a higher layer of the terminal device to the physical layer of the terminal device, optionally, the method further includes: reporting, by the terminal device, a third parameter set to the network device.

Optionally, the third parameter set includes at least one of: information about a resource that is used for performing the resource sensing, a condition parameter for determining the available resource set, and a transmission parameter of the target service.

Optionally, the information about the resource for performing the resource sensing includes at least one of: information about a resource pool for performing the resource sensing, information about a carrier for performing the resource sensing, information about a subband for performing the resource sensing, information about a number of physical resource blocks (PRBs) for performing the resource sensing, and information about a third time range.

The information about the third time range may include, for example, at least one of: information about a sensing window for performing the resource sensing, information about a resource selection window for performing resource selection, or a time range relative to a specific time point.

The specific time point may be, for example, any one of: a time point of resource sensing performed by the terminal device, a time point of reporting the available resource set by the terminal device, a first subframe (that is, a subframe 0) in a radio frame period, a time point at which the terminal device receives an instruction from the network device, a time point of occurrence of a service of the terminal device, or a time point determined based on subframe offset information and information about the service period of the terminal device. The subframe offset information and the service period may be carried in assistance information (UEAssistanceInformation) reported by the terminal device to the network device.

The time range may be, for example, [n+T1, n+T2], where n is the specific time point, T1>0, and T2>T1.

Optionally, the condition parameter for determining the available resource set includes at least one of: a physical sidelink shared channel-reference signal received power (PSSCH-RSRP) threshold, a number of resources and a percentage of available resources in the available resource set, where the percentage of available resources is a ratio of a number of resources in the available resource set to a total number of resources in the sensing window for performing the resource sensing; and/or Optionally, the transmission parameter of the target service includes at least one of the following parameters: information about a priority of the target service, information about a traffic volume of the target service, a transmission period of the target service, latency of the target service, a number of times of retransmission of the target service, a data packet size of the target service, or a modulation and coding scheme of the target service.

Understandably, parameters in the third parameter set may be the same as parameters in the first parameter set in part or in whole.

Optionally, in step 330, if the at least one carrier includes a target carrier, and the target resource is a resource in the available resource set on the target carrier, then the resource scheduling information may include an index of the target resource. The index of the target resource is used to indicate the location of the target resource in the sensing window of the target carrier, or indicate the location of the target resource in the available resource set on the target carrier, or indicate a time-frequency resource location of the target resource on the target carrier.

Specifically, the target resource on the target carrier is a resource selected by the network device for the terminal device to transmit the target service. The network device may transmit the resource scheduling information to the terminal device. The resource scheduling information includes an index of the target resource. The index of the target resource is used to indicate the location of the target resource in the available resource set, or indicate the location of the target resource in the sensing window of the target carrier, or indicate the time-frequency resource location of the target resource on the target carrier.

When the at least one carrier includes one carrier, the carrier is the target carrier.

When the at least one carrier includes a plurality of carriers, the target carrier may be, for example, a carrier with the lowest CBR value in the plurality of carriers. The terminal device may report a second parameter set to the network device. The second parameter set includes CBRs of the plurality of carriers, and the network device may determine the target carrier based on the received CBRs on the plurality of carriers.

For example, it is assumed that the available resource set that is reported by the terminal device to the network device and that is on the target carrier includes eight available resources, and the eight available resources are represented by a resource bitmap. It is assumed that the total number of resources in the sensing window in which the terminal device performs resource sensing is 12, and the resource bitmap used to represent the available resource set is 1100 1011 1011, where 1 indicates that the resource belongs to the available resource set, and 0 indicates that the resource does not belong to the available resource set. If the network device selects a second available resource based on the resource bitmap and allocates the resource to the terminal device, the network device may transmit resource scheduling information carrying the index 2 to the terminal device. The resource scheduling information instructs the terminal device to transmit the target service by using the second resource in the available resource set.

In another example, it is assumed that the available resource set that is reported by the terminal device to the network device and that is on the target carrier includes 12 available resources, and the terminal device reports the available resource set to the network device by using RRC signaling. In the RRC signaling, the available resource set includes time-domain information and frequency-domain information of each available resource. Based on the available resource set reported by the terminal device, the network device selects the fourth available resource in the available resource set as a transmission resource of the terminal device, and allocates the resource to the terminal device. Therefore, the network device may transmit resource scheduling information carrying the index 4 to the terminal device. The resource scheduling information instructs the terminal device to transmit the target service by using the fourth resource in the available resource set.

Understandably, the network device may use the foregoing resource index to indicate, to the terminal device, the target resource that is in the available resource set and that is used to transmit the target service.

Optionally, the available resource scheduling information includes K×N bits, K is the number of target resources, K is an integer greater than or equal to 1, N is the number of bits occupied by the index of the target resource, N=log 2(M), and M is the number of resources in the sensing window of the target carrier, or the number of resources in the available resource set on the target carrier, or the number of candidate target resource indexes reported by the terminal device to the network device.

For example, if the network device selects, in the available resource set on the target carrier, two transmission resources for the target service to transmit the target service twice, for example, to transmit the target service once and retransmit the target service once, then the resource scheduling information transmitted by the network device includes indexes of the two resources. The index of each resource is represented by N bits. Therefore, the two resources need to be represented by 2N bits, where N=log 2(M), and M is the number of resources in the available resource set on the target bearer, or the number of resources in the sensing window of the target carrier, or the number of candidate target resource indexes reported by the terminal device to the network device. For example, if the number of resources in the sensing window of the target carrier is 4000 (1000 subframes, each sub-frame having four subbands, totaling 4000 resources), then M=4000; or, if the number of resources in the available resource set on the target carrier is 1000, then M=1000; or, if the terminal device reports four candidate target resource indexes to the network device, then M=4.

Figure 4:
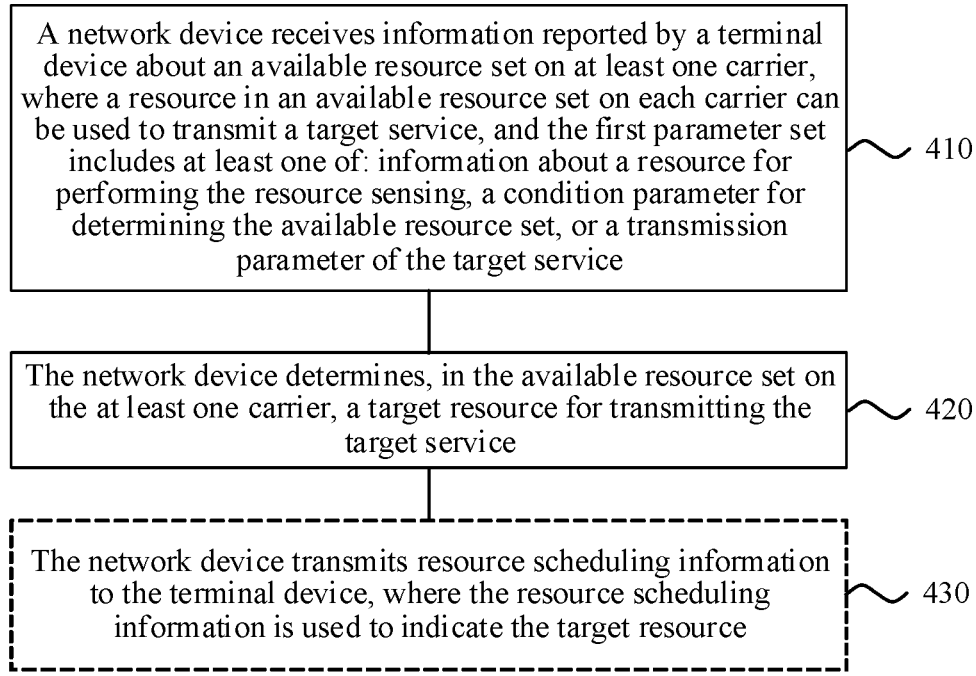
FIG. 4 is a schematic flowchart of a method for resource configuration in D2D communications according to another embodiment of this application.

FIG. 4 is a schematic flowchart of a method for resource configuration in D2D communications according to an embodiment of this application. The method shown in FIG. 4 may be performed by a network device, and the network device may be, for example, the network device 10 shown in FIG. 1. As shown in FIG. 4, the method for resource configuration in D2D communications includes the following steps.

In step 410, a network device receives information reported by a terminal device about an available resource set on at least one carrier.

Resources in an available resource set on each carrier may be used to transmit a target service.

In step 420, the network device determines, in the available resource set on the at least one carrier, a target resource for transmitting the target service. Optionally, the target resource is one or more resources in the available resource set on the at least one carrier.

Optionally, the method may further include step 430.

In step 430, the network device transmits resource scheduling information to the terminal device, where the resource scheduling information is used to indicate the target resource.

Therefore, the network device can allocate the transmission resource to the terminal device in the available resource set based on the available resource set reported by the terminal device. The resource in the available resource set is obtained by the terminal device based on the sensing result, and therefore, the selecting, by the network device, the resource for the terminal device in the available resource set can significantly reduce interference caused by and to other terminal devices.

Optionally, before the receiving, by a network device, information reported by a terminal device about an available resource set on at least one carrier, the method further includes: transmitting, by the network device, a first parameter set to the terminal device, where the first parameter set is used for the terminal device to perform resource sensing on the at least one carrier to obtain the available resource set on the at least one carrier, and the first parameter set includes at least one of: information about a resource for performing the resource sensing, a condition parameter for determining the available resource set, and a transmission parameter of the target service.

Optionally, the information about the resource for performing the resource sensing includes at least one of: information about a resource pool for performing the resource sensing, information about a carrier for performing the resource sensing, information about a subband for performing the resource sensing, information about a number of physical resource blocks (PRBs) for performing the resource sensing, or information about a sensing window for performing the resource sensing.

Optionally, the condition parameter for determining the available resource set includes at least one of: a physical sidelink shared channel-reference signal received power (PSSCH-RSRP) threshold, a number of resources and a percentage of available resources in the available resource set, where the percentage of available resources is a ratio of a number of resources in the available resource set to a total number of resources in the sensing window for performing the resource sensing.

Optionally, the transmission parameter of the target service includes at least one of the following parameters: information about a priority of the target service, information about a traffic volume of the target service, a transmission period of the target service, latency of the target service, a number of times of retransmission of the target service, a data packet size of the target service, or a modulation and coding scheme of the target service.

Optionally, before the transmitting, by the network device, a first parameter set to the terminal device, the method further includes: receiving, by the network device, a second parameter set reported by the terminal device, where the second parameter set includes at least one of: a channel busy ratio (CBR) of each of the plurality of carriers, a buffer status report (BSR), a priority of the target service, or a latency requirement of the target service; and determining, by the network device, the first parameter set based on the second parameter set.

Optionally, the receiving, by a network device, information reported by a terminal device about an available resource set on at least one carrier includes: receiving, by the network device, the information reported by the terminal device about the available resource set on the at least one carrier by using uplink control information (UCI), a media access control (MAC) control element (CE), or radio resource control (RRC) signaling.

Optionally, the receiving, by a network device, information reported by a terminal device about an available resource set on at least one carrier includes: receiving, by the network device, assistance information (UEAssistanceInformation) while receiving the information reported by the terminal device about the available resource set on the at least one carrier, where the assistance information is reported by the terminal device.

Optionally, the receiving, by a network device, information reported by a terminal device about an available resource set on at least one carrier includes: receiving, by the network device, a resource bitmap that is reported by the terminal device and that is of the at least one carrier. The resource bitmap of each carrier includes a plurality of bits, the plurality of bits are in one-to-one correspondence with a plurality of resources in the sensing window in which the terminal device performs the resource sensing on each carrier, and a value of each of the plurality of bits indicates whether a resource corresponding to the each bit belongs to an available resource set on each carrier.

Optionally, the receiving, by a network device, information reported by a terminal device about an available resource set on at least one carrier includes: receiving, by the network device, an index that is reported by the terminal device and that is of at least one candidate target resource in the available resource set on the at least one carrier. An index of each candidate target resource in an available resource set on each carrier is used to indicate the location of each candidate target resource in the sensing window of each carrier, or indicate the location of each candidate target resource in an available resource set on each carrier, or indicate a time-frequency resource location of each candidate target resource on each carrier.

Optionally, the at least one carrier includes a target carrier, and the target resource is a resource in an available resource set on the target carrier.

The resource scheduling information includes an index of the target resource, the index of the target resource is used to indicate the location of the target resource among a plurality of resources in the sensing window of the target carrier, or indicate the location of the target resource in the available resource set on the target carrier, or indicate the time-frequency resource location of the target resource on the target carrier.

Optionally, the resource scheduling information includes K×N bits, where K is the number of target resources, K is an integer greater than or equal to 1, N is the number of bits occupied by the index of the target resource, N=log 2(M), and M is the number of resources in the sensing window of the target carrier, or the number of resources in the available resource set on the target carrier, or the number of candidate target resource indexes reported by the terminal device to the network device.

Understandably, for a detailed process of resource configuration performed by the network device, refer to relevant description of the terminal device in FIG. 3. For brevity, details are not described herein again.

Further, understandably, in various embodiments of this application, the sequence number of a step described above does not mean the implementation order of the step. The implementation order of each step shall depend on its functionality and intrinsic logic, and shall not constitute any limitation on the implementation process of the embodiment of this application.

It should be noted that, to the extent that no conflict occurs, the embodiments of this application and/or the technical features of the embodiments described herein may be combined with each other as required, and the technical solutions obtained after the combination shall also fall within the protection scope of this application.

The foregoing has described in detail the method for resource configuration in D2D communications according to the embodiment of this application. The following will describe an apparatus according to an embodiment of this application with reference to FIG. 5 to FIG. 8. The technical features described in the method embodiment are applicable to the following apparatus embodiment.

Figure 5:
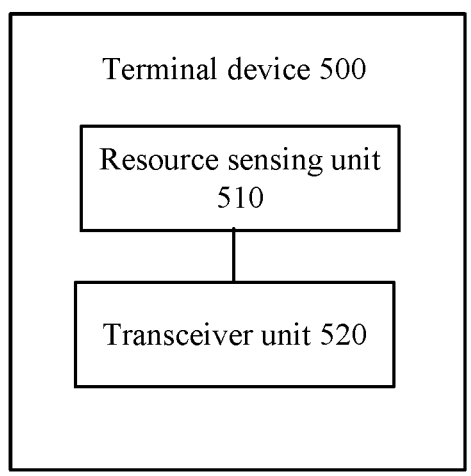
FIG. 5 is a schematic block diagram of a terminal device according to an embodiment of this application.

FIG. 5 is a schematic block diagram of a terminal device 500 according to an embodiment of this application. As shown in FIG. 5, the terminal device 500 includes a sensing unit 510 and a transceiver unit 520.

The resource sensing unit 510 is configured to perform resource sensing on at least one carrier based on a first parameter set to obtain an available resource set on the at least one carrier, where a resource in an available resource set on each carrier can be used to transmit a target service, and the first parameter set includes at least one of: information about a resource for performing the resource sensing, a condition parameter for determining the available resource set, or a transmission parameter of the target service.

The transceiver unit 520 is configured to report, to a network device, information about the available resource set that is obtained by the sensing unit 510 and that is on the at least one carrier.

Therefore, the terminal device performs resource sensing based on a specific transmission parameter, and determines the available resource set based on a sensing result. By reporting the available resource set to the network device, the terminal device assists the network device in allocating a transmission resource to the terminal device, thereby reducing interference.

Optionally, the information about the resource for performing the resource sensing includes at least one of: information about a resource pool for performing the resource sensing, information about a carrier for performing the resource sensing, information about a subband for performing the resource sensing, information about a number of physical resource blocks (PRBs) for performing the resource sensing, or information about a sensing window for performing the resource sensing; and/or The condition parameter for determining the available resource set includes at least one of: a physical sidelink shared channel-reference signal received power (PSSCH-RSRP) threshold, a number of resources and a percentage of available resources in the available resource set, where the percentage of available resources is a ratio of a number of resources in the available resource set to a total number of resources in the sensing window for performing the resource sensing; and/or The transmission parameter of the target service includes at least one of the following parameters: information about a priority of the target service, information about a traffic volume of the target service, a transmission period of the target service, latency of the target service, a number of times of retransmission of the target service, a data packet size of the target service, or a modulation and coding scheme of the target service.

Optionally, the transceiver unit 520 is specifically configured to: receive, at a physical layer, the first parameter set transmitted from a higher layer; or receive the first parameter set transmitted by the network device.

Optionally, the transceiver unit 520 is further configured to: report a second parameter set to the network device, where the second parameter set includes at least one of: a channel busy ratio (CBR) of each of a plurality of carriers, a buffer status report (BSR), the priority of the target service, or a latency requirement of the target service.

Optionally, the transceiver unit 520 is specifically configured to: report the information about the available resource set on the at least one carrier to the network device by using uplink control information (UCI), a media access control (MAC) control element (CE), or radio resource control (RRC) signaling.

Optionally, the transceiver unit 520 is specifically configured to: report assistance information of the terminal device while reporting the information about the available resource set on the at least one carrier to the network device.

Optionally, the transceiver unit 520 is specifically configured to: report a resource bitmap of the at least one carrier to the network device, where the resource bitmap of each carrier includes a plurality of bits, the plurality of bits are in one-to-one correspondence with a plurality of resources in the sensing window in which the terminal device performs the resource sensing on each carrier, or the plurality of bits are in one-to-one correspondence with a plurality of resources in a resource selection window of the terminal device on each carrier, and a value of each of the plurality of bits indicates whether a resource corresponding to the each bit belongs to an available resource set on each carrier.

Optionally, the transceiver unit 520 is specifically configured to: report an index of at least one candidate target resource in the available resource set on the at least one carrier to the network device, where an index of each candidate target resource in an available resource set on each carrier is used to indicate a location of each candidate target resource in the sensing window of each carrier, or indicate a location of each candidate target resource in the resource selection window of each carrier, or indicate a location of each candidate target resource in an available resource set on each carrier, or indicate a time-frequency resource location of each candidate target resource on each carrier.

Optionally, the transceiver unit 520 is further configured to: receive resource scheduling information transmitted by the network device, where the resource scheduling information indicates a target resource for transmitting the target service.

Optionally, the at least one carrier includes a target carrier, and the target resource is a resource in the available resource set on the target carrier. The resource scheduling information includes an index of the target resource. The index of the target resource is used to indicate the location of the target resource in the sensing window of the target carrier, or indicate the location of the target resource in the available resource set on the target carrier, or indicate a time-frequency resource location of the target resource on the target carrier.

Optionally, the resource scheduling information includes K×N bits, where K is the number of target resources, K is an integer greater than or equal to 1, N is the number of bits occupied by the index of the target resource, N=log 2(M), and M is the number of resources in the sensing window of the target carrier, or the number of resources in the available resource set on the target carrier, or the number of candidate target resource indexes reported by the terminal device to the network device.

Understandably, the terminal device 500 can perform the corresponding operations of the method 300 performed by the terminal device in the foregoing method embodiment. For brevity, no details are described herein again.

Figure 6:
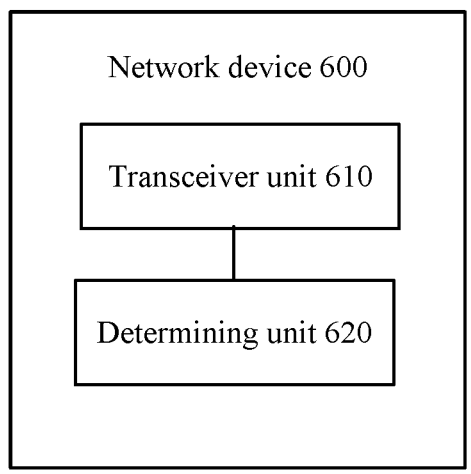
FIG. 6 is a schematic block diagram of a network device according to an embodiment of this application.

FIG. 6 is a schematic block diagram of a network device 600 according to an embodiment of this application. As shown in FIG. 6, the network device 600 includes a transceiver unit 610 and a determining unit 620.

The transceiver unit 610 is configured to receive information reported by a terminal device about an available resource set on at least one carrier, where a resource in an available resource set on each carrier may be used to transmit a target service.

The determining unit 620 is configured to determine, in the available resource set that is received by the transceiver unit 610 and that is on the at least one carrier, a target resource for transmitting the target service.

Therefore, the network device can allocate the transmission resource to the terminal device in the available resource set based on the available resource set reported by the terminal device. The resource in the available resource set is obtained by the terminal device based on the sensing result, and therefore, the selecting, by the network device, the resource for the terminal device in the available resource set can significantly reduce interference caused by and to other terminal devices.

Optionally, the transceiver unit 610 is further configured to: transmit a first parameter set to the terminal device, where the first parameter set is used for the terminal device to perform resource sensing on the at least one carrier to obtain the available resource set on the at least one carrier, and the first parameter set includes at least one of: information about a resource for performing the resource sensing, a condition parameter for determining the available resource set, and a transmission parameter of the target service.

Optionally, the information about the resource for performing the resource sensing includes at least one of: information about a resource pool for performing the resource sensing, information about a carrier for performing the resource sensing, information about a subband for performing the resource sensing, information about a number of physical resource blocks (PRBs) for performing the resource sensing, or information about a sensing window for performing the resource sensing; and/or the condition parameter for determining the available resource set includes at least one of: a physical sidelink shared channel-reference signal received power (PSSCH-RSRP) threshold, a number of resources and a percentage of available resources in the available resource set, where the percentage of available resources is a ratio of a number of resources in the available resource set to a total number of resources in the sensing window for performing the resource sensing; and/or the transmission parameter of the target service includes at least one of the following parameters: information about a priority of the target service, information about a traffic volume of the target service, a transmission period of the target service, latency of the target service, a number of times of retransmission of the target service, a data packet size of the target service, or a modulation and coding scheme of the target service.

Optionally, the transceiver unit 610 is further configured to: transmit the first parameter set to the terminal device, where the first parameter set is used for the terminal device to perform resource sensing on the at least one carrier to obtain an available resource set on the at least one carrier.

Optionally, the transceiver unit 610 is further configured to: receive a second parameter set reported by the terminal device, where the second parameter set includes at least one of: a channel busy ratio (CBR) of each of the plurality of carriers, a buffer status report (BSR), a priority of the target service, or a latency requirement of the target service; and the determining unit 620 is further configured to determine the first parameter set based on the second parameter set.

Optionally, the transceiver unit 610 is specifically configured to: receive the information reported by the terminal device about the available resource set on the at least one carrier by using uplink control information (UCI), a media access control (MAC) control element (CE), or radio resource control (RRC) signaling.

Optionally, the transceiver unit 610 is specifically configured to: receive assistance information while receiving the information reported by the terminal device about the available resource set on the at least one carrier, where the assistance information is reported by the terminal device.

Optionally, the transceiver unit 610 is specifically configured to: receive a resource bitmap that is reported by the terminal device and that is of the at least one carrier, where the resource bitmap of each carrier includes a plurality of bits, the plurality of bits are in one-to-one correspondence with a plurality of resources in the sensing window in which the terminal device performs the resource sensing on each carrier, or the plurality of bits are in one-to-one correspondence with a plurality of resources in a resource selection window of the terminal device on each carrier, and a value of each of the plurality of bits indicates whether a resource corresponding to the each bit belongs to an available resource set on each carrier.

Optionally, the transceiver unit 610 is specifically configured to: receive an index that is reported by the terminal device and that is of at least one candidate target resource in the available resource set on the at least one carrier. An index of each candidate target resource in an available resource set on each carrier is used to indicate a location of each candidate target resource in the sensing window of each carrier, or indicate a location of each candidate target resource in the resource selection window of each carrier, or indicate a location of each candidate target resource in an available resource set on each carrier, or indicate a time-frequency resource location of each candidate target resource on each carrier.

Optionally, the transceiver unit 610 is further configured to: transmit resource scheduling information to the terminal device, where the resource scheduling information is used to indicate the target resource determined by the determining unit 620.

Optionally, the at least one carrier includes a target carrier, and the target resource is a resource in the available resource set on the target carrier. The resource scheduling information includes an index of the target resource. The index of the target resource is used to indicate the location of the target resource among a plurality of resources in the sensing window of the target carrier, or indicate the location of the target resource in the available resource set on the target carrier, or indicate a time-frequency resource location of the target resource on the target carrier.

Optionally, the resource scheduling information includes K×N bits, where K is the number of target resources, K is an integer greater than or equal to 1, N is the number of bits occupied by the index of the target resource, N=log 2(M), and M is the number of resources in the sensing window of the target carrier, or the number of resources in the available resource set on the target carrier, or the number of candidate target resource indexes reported by the terminal device to the network device.

Understandably, the network device 600 can perform the corresponding operations of the method 400 performed by the network device in the foregoing method embodiment. For brevity, no details are described herein again.

Figure 7:
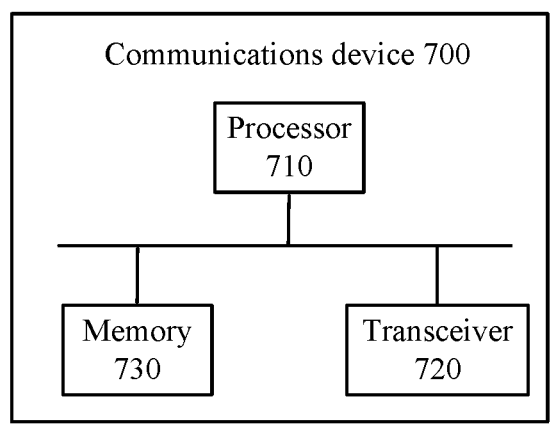
FIG. 7 is a schematic structural diagram of a communications device according to an embodiment of this application.

FIG. 7 is a schematic structural diagram of a communications device 700 according to an embodiment of this application. As shown in FIG. 7, the communications device includes a processor 710, a transceiver 720, and a memory 730. The processor 710, the transceiver 720, and the memory 730 communicate with each other through an internal connection path. The memory 730 is configured to store an instruction, and the processor 710 is configured to execute the instruction stored in the memory 730, to control the transceiver 720 to receive a signal or send a signal.

Optionally, the processor 710 may invoke program code stored in the memory 730, to perform corresponding operations in the method 300 performed by the terminal device in the method embodiments. For brevity, details are not described herein again.

Optionally, the processor 710 may invoke program code stored in the memory 730, to perform corresponding operations in the method 400 performed by the network device in the method embodiments. For brevity, details are not described herein again.

It should be understood that, the processor of this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field-programmable gate array (FPGA), or another programmable logic device, discrete gate or transistor logic device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a nonvolatile memory, or may include both a volatile memory and a non-volatile memory. The nonvolatile memory may be a read-only memory (ROM), a programmable read-only memory (PROM), an erasable programmable read-only memory (erasable PROM, EPROM), an electrically erasable programmable read-only memory (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

Figure 8:
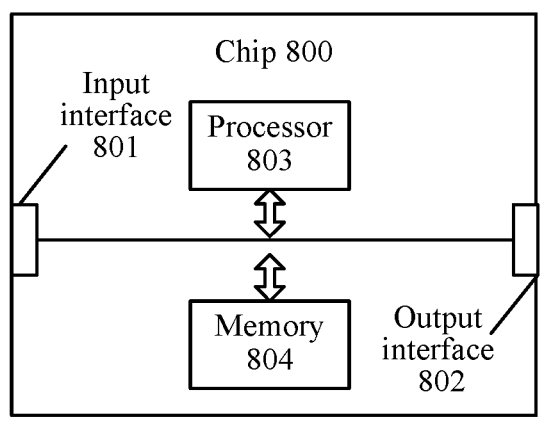
FIG. 8 is a schematic structural diagram of a chip according to an embodiment of this application.

FIG. 8 is a schematic structural diagram of a chip according to an embodiment of this application. The chip 800 in FIG. 8 includes an input interface 801, an output interface 802, at least one processor 803, and a memory 804. The input interface 801, the output interface 802, the processor 803, and the memory 804 are connected through an internal connection path. The processor 803 is configured to execute code stored in the memory 804.

Optionally, when the code is executed, the processor 803 may implement the method 300 performed by the terminal device in the method embodiments. For brevity, details are not described herein again.

Optionally, when the code is executed, the processor 803 may implement the method 400 performed by the network device in the method embodiments. For brevity, details are not described herein again.

It should be noted that, the chip mentioned in the embodiments of this application may also be referred to as a system-level chip, a system chip, a chip system, a system on chip, or the like.

Figure 9:
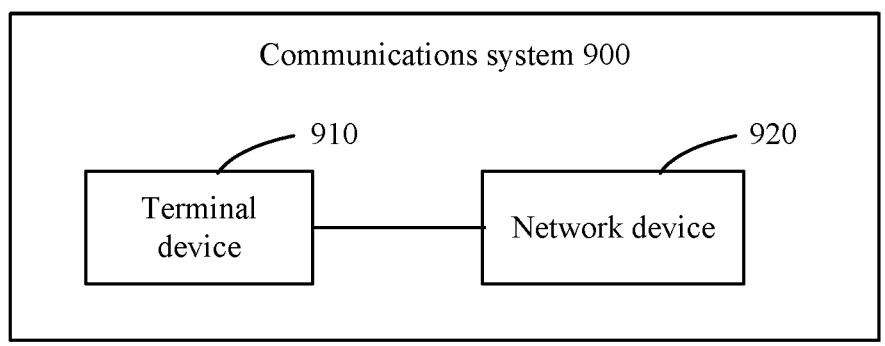
FIG. 9 is a schematic structural diagram of a communications system according to an embodiment of this application.

FIG. 9 is a schematic block diagram of a communications system 900 according to an embodiment of this application. As shown in FIG. 9, the communications system 900 includes a terminal device 910 and a network device 920.

The terminal device 910 is configured to: perform resource sensing on at least one carrier based on a first parameter set to obtain an available resource set on the at least one carrier, where the resource in an available resource set on each carrier is configured to transmit a target service, and the first parameter set includes at least one of: information about a resource for performing the resource sensing, a condition parameter for determining the available resource set, or a transmission parameter of the target service; and report information about the available resource set on the at least one carrier to a network device.

The network device 920 is configured to: receive the information of the available resource set that is reported by the terminal device and on the at least one carrier, where the resource in an available resource set on each carrier may be used for transmitting the target service; and determine the target resource of the target service in the available resource set on the at least one carrier.

The terminal device 910 may be configured to implement the corresponding function implemented by the terminal device in the method 300. The composition of the terminal device 910 may be as shown in the terminal device 500 in FIG. 5. For brevity, details are not described herein again.

The network device 920 may be configured to implement the corresponding function implemented by the network device in the method 400. The composition of the network device 920 may be as shown in the network device 600 in FIG. 6. For brevity, details are not described herein again.

It should be understood that in this embodiment of the present disclosure, "B corresponding to A" indicates that B is associated with A, and B may be determined based on A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one monitoring unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for resource configuration in device-to-device (D2D) communications, the method comprising:
   receiving, by a terminal device, a first parameter set transmitted by a network device, wherein the first parameter set comprises information about a resource pool for performing a resource sensing, information about a carrier for performing the resource sensing, information about a subband for performing the resource sensing, information about a priority of a target service, and a transmission period of the target service;
   performing, by the terminal device, the resource sensing on at least one carrier based on the first parameter set to obtain an available resource set on the at least one carrier, wherein a resource in the available resource set on each carrier can be used to transmit the target service; and
   reporting, by the terminal device, information about the available resource set on the at least one carrier to the network device;
   wherein the reporting, by the terminal device, the information about the available resource set on the at least one carrier to the network device comprises: reporting, by the terminal device, an index of at least one candidate target resource in the available resource set on the at least one carrier to the network device, wherein the index of each candidate target resource in the available resource set on each carrier is used to:
      indicate a location of each candidate target resource in a resource selection window of each carrier.

2. The method of claim 1, wherein the first parameter set further comprises at least one of:
   information about a number of physical resource blocks (PRBs) for performing the resource sensing, information about a sensing window for performing the resource sensing, or information about the resource selection window for performing resource selection; or
   information about a traffic volume of the target service, latency of the target service, a number of times of retransmission of the target service, a data packet size of the target service, or a modulation and coding scheme of the target service.

3. The method of claim 1, further comprising:
   reporting, by the terminal device, a second parameter set to the network device, wherein the second parameter set comprises at least one of: a channel busy ratio (CBR) of each of the at least one carrier, a buffer status report (BSR), a transmission period of the target service, a priority of the target service, or a latency requirement of the target service.

4. The method of claim 1, wherein the reporting, by the terminal device, the information about the available resource set on the at least one carrier to the network device comprises reporting, by the terminal device, the information about the available resource set on the at least one carrier to the network device by using uplink control information (UCI), a media access control (MAC) control element (CE), or radio resource control (RRC) signaling.

5. The method of claim 1, wherein the reporting, by the terminal device, the information about the available resource set on the at least one carrier to the network device comprises reporting, by the terminal device, assistance information of the terminal device while reporting the information about the available resource set on the at least one carrier to the network device.

6. A terminal device comprising: a processor and a memory, wherein the memory is configured to store an instruction, and the processor is configured to execute the instruction stored in the memory,
   when the processor executes the instruction stored in the memory, the terminal device is configured to:
      receive a first parameter set transmitted by a network device, wherein the first parameter set comprises information about a resource pool for performing a resource sensing, information about a carrier for performing the resource sensing, information about a subband for performing the resource sensing, information about a priority of a target service, and a transmission period of the target service;
      perform the resource sensing on at least one carrier based on the first parameter set to obtain an available resource set on the at least one carrier, wherein a resource in the available resource set on each carrier can be used to transmit the target service,
      report, to the network device, information about the available resource set that is on the at least one carrier; and
      report an index of at least one candidate target resource in the available resource set on the at least one carrier to the network device, wherein the index of each candidate target resource in the available resource set on each carrier is used to:
         indicate a location of each candidate target resource in a resource selection window of each carrier.

7. The terminal device of claim 6, wherein the first parameter set further comprises at least one of:
   information about a number of physical resource blocks (PRBs) for performing the resource sensing, information about a sensing window for performing the resource sensing, or information about the resource selection window for performing resource selection; or
   information about a traffic volume of the target service, latency of the target service, a number of times of retransmission of the target service, a data packet size of the target service, or a modulation and coding scheme of the target service.

8. The terminal device of claim 6, wherein the terminal device is further configured to report a second parameter set to the network device, wherein the second parameter set comprises at least one of: a channel busy ratio (CBR) of each of the at least one carrier, a buffer status report (BSR), a transmission period of the target service, a priority of the target service, or a latency requirement of the target service.

9. The terminal device of claim 6, wherein the terminal device is further configured to report the information about the available resource set on the at least one carrier to the network device by using uplink control information (UCI), a media access control (MAC) control element (CE), or radio resource control (RRC) signaling.

10. The terminal device of claim 6, wherein the terminal device is further configured to report assistance information of the terminal device while reporting the information about the available resource set on the at least one carrier to the network device.

11. A non-transitory computer-readable storage medium storing computer-executable instructions that, when executed by a computer system, configure the computer system to perform operations comprising:

receiving, by a terminal device, a first parameter set transmitted by a network device, wherein the first parameter set comprises information about a resource pool for performing a resource sensing, information about a carrier for performing the resource sensing, information about a subband for performing the resource sensing, information about a priority of a target service, and a transmission period of the target service;

performing, by the terminal device, the resource sensing on at least one carrier based on the first parameter set to obtain an available resource set on the at least one carrier, wherein a resource in the available resource set on each carrier can be used to transmit the target service; and reporting, by the terminal device, information about the available resource set on the at least one carrier to the network device;

wherein the reporting, by the terminal device, the information about the available resource set on the at least one carrier to the network device comprises: reporting, by the terminal device, an index of at least one candidate target resource in the available resource set on the at least one carrier to the network device, wherein the index of each candidate target resource in the available resource set on each carrier is used to:

indicate a location of each candidate target resource in a resource selection window of each carrier.

12. The non-transitory computer-readable storage medium of claim 11, wherein the first parameter set further comprises at least one of:

information about a number of physical resource blocks (PRBs) for performing the resource sensing, information about a sensing window for performing the resource sensing, or information about the resource selection window for performing resource selection; or information about a traffic volume of the target service, latency of the target service, a number of times of retransmission of the target service, a data packet size of the target service, or a modulation and coding scheme of the target service.

13. The non-transitory computer-readable storage medium of claim 11, wherein the reporting, by the terminal device, the information about the available resource set on the at least one carrier to the network device comprises reporting, by the terminal device, the information about the available resource set on the at least one carrier to the network device by using uplink control information (UCI), a media access control (MAC) control element (CE), or radio resource control (RRC) signaling.

14. The non-transitory computer-readable storage medium of claim 11, wherein the reporting, by the terminal device, the information about the available resource set on the at least one carrier to the network device comprises reporting, by the terminal device, assistance information of the terminal device while reporting the information about the available resource set on the at least one carrier to the network device.

* * * * *